(12) United States Patent
Spartiotis et al.

(10) Patent No.: US 7,154,100 B2
(45) Date of Patent: Dec. 26, 2006

(54) SWITCHING/DEPOLARIZING POWER SUPPLY FOR A RADIATION IMAGING DEVICE

(76) Inventors: Konstantinos Spartiotis, Tietotie 3, Espoo 02150 (FI); Olli Mannisto, Tietotie 3, Espoo 02150 (FI)

( * ) Notice: Subject to any disclaimer, the term of this patent is extended or adjusted under 35 U.S.C. 154(b) by 0 days.

(21) Appl. No.: 10/537,531

(22) PCT Filed: Dec. 11, 2003

(86) PCT No.: PCT/US03/39432

§ 371 (c)(1),
(2), (4) Date: Jun. 3, 2005

(87) PCT Pub. No.: WO2004/055550

PCT Pub. Date: Jul. 1, 2004

(65) Prior Publication Data

US 2006/0097180 A1    May 11, 2006

Related U.S. Application Data

(60) Provisional application No. 60/433,457, filed on Dec. 13, 2003.

(51) Int. Cl.
G01T 1/24 (2006.01)
(52) U.S. Cl. .............................. 250/370.13
(58) Field of Classification Search ............ 250/370.13
See application file for complete search history.

(56) References Cited

U.S. PATENT DOCUMENTS 4,133,025 A    1/1979    Wurzburg
4,255,659 A    3/1981    Kaufman et al.

FOREIGN PATENT DOCUMENTS

WO    WO 2004/055550 A1    7/2004

*Primary Examiner*—Constantine Hannaher
(74) *Attorney, Agent, or Firm*—Sherman D. Pernia; Moetteli & Associates (57) ABSTRACT

A high voltage switching power supply (10) for an X-ray/Gamma ray imaging camera provides high voltage switching and depolarization capabilities. The power supply includes a high voltage polarity switching and an image detector charge bleeding circuit (90) and is particularly useful with high energy radiation imaging cameras utilizing Cd—Te based detector substrates, especially substrates with blocked contacts, where charge accumulation in the detector material reduces imaging efficiency.

3 Claims, 7 Drawing Sheets

SWITCHING/DEPOLARIZING POWER SUPPLY FOR A RADIATION IMAGING DEVICE

The present application claims the benefit of prior filed U.S. Provisional Application Ser. No. 60/433,457 filed 13 Dec. 2003, to which the present application is a regular U.S. national patent application.

FIELD OF THE INVENTION

The present invention relates to the field of digital imaging of X-ray and gamma ray radiation. More specifically it relates to switching-type voltage power supplies for digital X-ray and gamma ray imaging devices.

BACKGROUND OF THE INVENTION

The present invention relates to a Dynamic Imaging Camera (DIC) or Scanning Camera (SCAN) having Cadmium-Telluride (Cd—Te, including Cd—Zn—Te) based radiation detectors for imaging X-ray signals. Cd—Te based detectors for imaging X-ray signals are known in the art, and are particularly useful for high energy radiation imaging. High energy radiation imaging include X-ray and gamma ray radiation in the 1.0 KeV and greater range. Typically, these detectors have a blocking contact on one face and pixel contacts on another face. In turn, the pixel contacts are bump-bonded to charge integrating application specific integrated circuits (ASICs). The blocking contact serves to reduce the dark or ambient current of the detector by a factor of 3 to 10. Lower dark currents mean higher sensitivity to incoming x-rays (signal).

However, a problem can exist in a Cd—Te detector having a blocking contact. Such contacts (e.g., Indium based blocking contacts) can polarize after a few seconds of operation, i.e., one to several hundreds of seconds. Polarization means that the detector starts to loose signal and the image loses definition or acuity and gets more blurry. Polarization happens due to gradual electric charge trapping inside the material bulk of the Cd—Te detector. Previously, one could not use a Cd—Te detector material in this X-ray imaging mode for more than a few seconds, due to the polarization effect.

Therefore, it would be useful in the field to have a means for preventing or overcoming the effect of electric charge trapping in high energy X-ray imaging systems utilizing Cd—Te based radiation detectors.

SUMMARY OF THE INVENTION

A Cadmium-Telluride (Cd—Te) based DIC detector typically requires a high voltage (HV) bias potential to operate properly. Unfortunately, such detectors can quickly accumulate an electrical charge and become polarized. The polarization charge offsets the HV bias potential and adversely affects operation and image quality of the camera imaging device. Once it becomes polarized, the detector unit requires a "refresh" action, i.e., the bleeding-off of the trapped or accumulated electric charge to depolarize the detector unit and restore operational efficiency of the device.

The present invention is a high voltage (HV) switching power supply for use with a high energy X-ray camera imaging device with a Cd—Te based detector (including a CdZnTe based detector). Such X-ray imaging cameras typically comprise a detector substrate bonded to a CMOS substrate and mounted to an interface/signal processing board, in combination with a power supply. The output from the camera is typically communicated to a computer for image processing. The depolarizing, switching HV power supply of the present invention is intended as a power supply for such an X-ray imaging camera.

The present HV switching power supply enables the use of Cd—Te detectors (especially those having blocking contacts) in dynamic imaging camera X-ray imaging systems and scanning camera/sensor imaging systems. The HV power supply is used to supply HV to the Cd—Te detector of the X-ray imaging system. The HV output of the HV power supply is switchable (on/off) at user defined intervals. For example, every few seconds the HV output of the switching power supply automatically cycles off for a few milliseconds and then very fast on again. When the HV output goes off, any electrical charge trapped at the detector(s) is able to bleed-off, which reverses or prevents polarization of the detector. This prevents the accumulation of electric charge and polarization of a Cd—Te detector having a blocking contact. The prevention of polarization allows continuous usage of a Cd—Te type detector DIC imaging device, and enables the use of such devices for inline imaging, e.g., in non-destructive testing or automated X-ray inspection systems.

The present depolarizing, HV switching power supply provides both high and low voltages useful for powering a Cd—Te base radiation detector, with or without a blocking contact. Typical low and high voltage requirements for Cd—Te base radiation detectors are known in the art. For example, low bias voltage requirements for the Cd—Te type detectors are on the order of +/−1.0V to +/−15.0V DC to operate the detector's internal circuits. The present HV switching power supply also provides an adjustable high bias voltage from +80 VDC to +450 VDC for driving the detector.

By using the present power supply that switches on/off the High Voltage as described herein, a plurality of dynamic imaging applications utilizing CdTe or CdZnTe detectors becomes possible. The applicant has developed already cameras that operate at 50 frames per second, 100 fps or even 400 fps. These cameras operate smoothly over many hours or indeed days without a need to manually refresh the detectors (by manually powering off, waiting and then switching the HV on again). The smooth, stable and uninterrupted operation in X-ray imaging applications is essential. Example applications where such DIC or SCAN cameras can be used included but are not limited to non destructive testing, inline inspection, automatic X-ray inspection, dental panoramic imaging, Computerized Tomography etc.

Additionally, while it was emphasized that the current invention is mostly suitable for CdTe or CdZnTe based detectors with a blocking contact, it can also have application in CdTe or CdZnTe detectors without blocking contact, but equipped with Platinum (Pt), Gold (Au) or other conventional contacts. Even such conventional contacts can create polarization after many minutes or hours and a power HV supply as described herein is ideal for the smooth and stable operation over many hours or indeed days.

DETAILED DESCRIPTION OF THE INVENTION

Referring now to the drawings, the details of preferred embodiments of the present invention are graphically and schematically illustrated. Like elements in the drawings are represented by like numbers, and any similar elements are represented by like numbers with a different lower case letter suffix.

Figure 1:
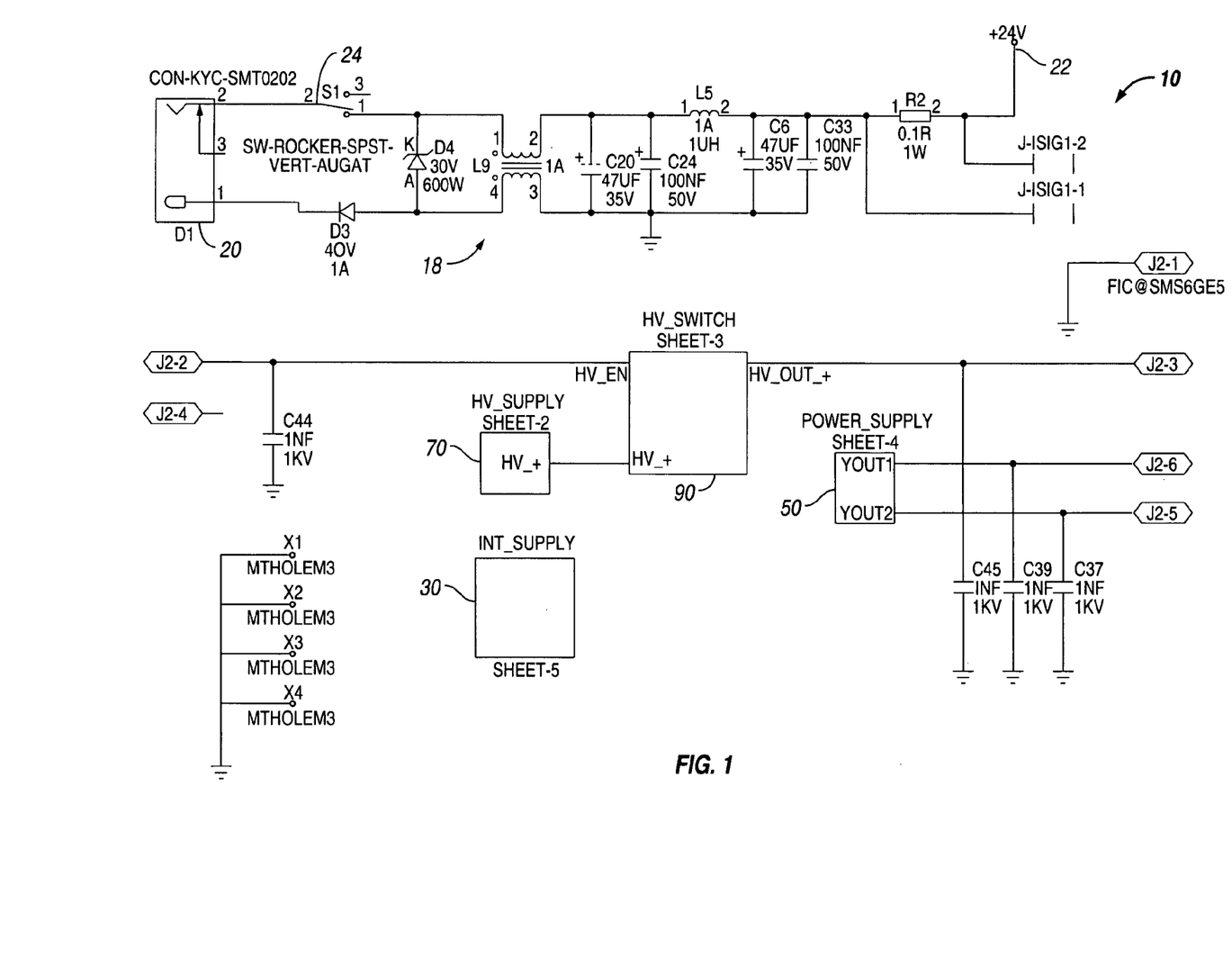
FIGS. 1 to 5 are schematic representations illustrating the present depolarizing/switching power supply and component circuits.

FIG. 1 generally illustrates the present depolarizing/switching power supply 10 of the present invention. In a preferred embodiment exemplified in FIG. 1, the present invention was externally supplied with +24V DC from a medical grade external power source (not shown). Of course, an alternative such a power source of an appropriate supply voltage is known to and selectable by one of ordinary skill in the art for practice in the present invention, either internally or externally. In this embodiment, the supply power requirement for the present switching power supply was on the order of about 10 W.

As illustrated in FIG. 1, the present HV switching power supply 10 comprised the combination of five main circuits: a control/conditioning circuit 18, an internal power supply 30, a low voltage power supply 50, a high voltage power supply 70, and a high voltage switch 90. The conditioning/control circuit 18 has an external power source connection 20 and included a main power on/off switch 24. The conditioning circuit 18 conditions the external power appropriately for use by the other circuits of the power supply 10. A main operating voltage power connection 22 communicates the conditioned electrical power to the other circuits of the power supply 10. Preferably, the present HV switching power supply 10 is electrically shielded, as is accomplishable by one of ordinary skill in the art. In a preferred embodiment, the switching power supply was housed in a metal casing (not shown), which casing was connected to a power supply ground J2-1 to attenuate or eliminate electromagnetic interference (EMI). Generally, the connectors utilized in the power supply are protected from electrostatic discharge (ESD) and filtered for EMI, and the DC voltage connections are protected from reverse polarity and voltage spikes. Additionally, the high voltage enable signal circuit is protected from over voltages and has a pull-down feature. The know-how to accomplish such protections in the present invention are known to and practicable by the ordinary skilled artisan. Preferably, shielded cable is utilized for current carrying conductors and coaxial cable for bias voltage conductors.

Figure 2:
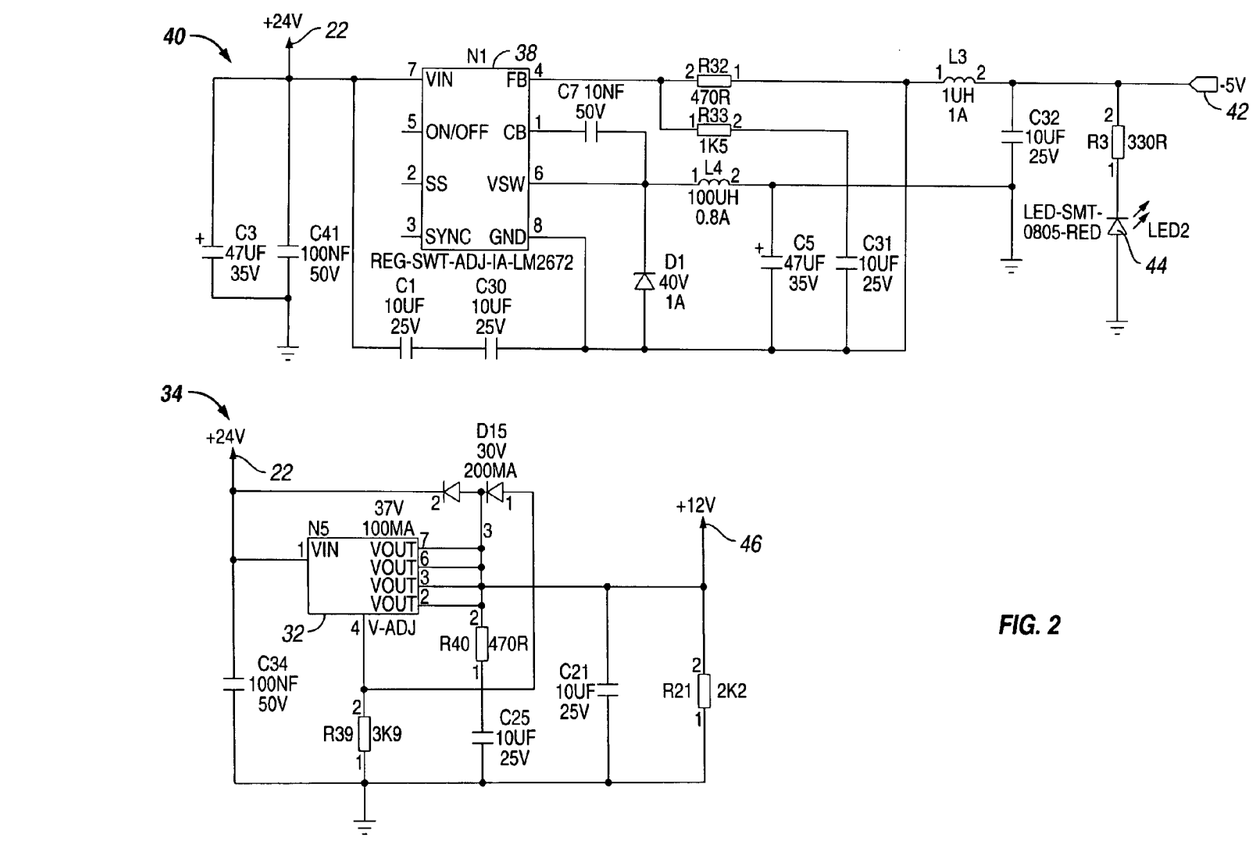

FIG. 2 is a schematic diagram of a preferred embodiment of an internal power supply circuit (int_supply) 30 practiced in the present HV switching power supply 10: The internal power supply 30 provides low voltage power as required for the other circuits of the present switching power supply 10. The internal power supply 30 comprises a linear regulator (N5) 32 and linear regulator circuit 34 adjusted to provide a +12V DC output 46. An LM317 integrated circuit was utilized as the linear regulator 32 of the linear regulator circuit 34. The internal power supply 30 also comprises a switching regulator (N1) 38 and switching regulator circuit 40. The switching regulator circuit 40 provide the low negative voltage (e.g., −5V DC in the embodiment illustrated) as required in the other circuits of the HV switching power supply 10 at the negative bias voltage output 42. A National LM2672 integrated circuit 260 kHz switching regulator in buck-boost configuration was utilized as the switching regulator 38. A minimum drain for the negative bias voltage output 42 was provided by an LED 44.

Figure 3:
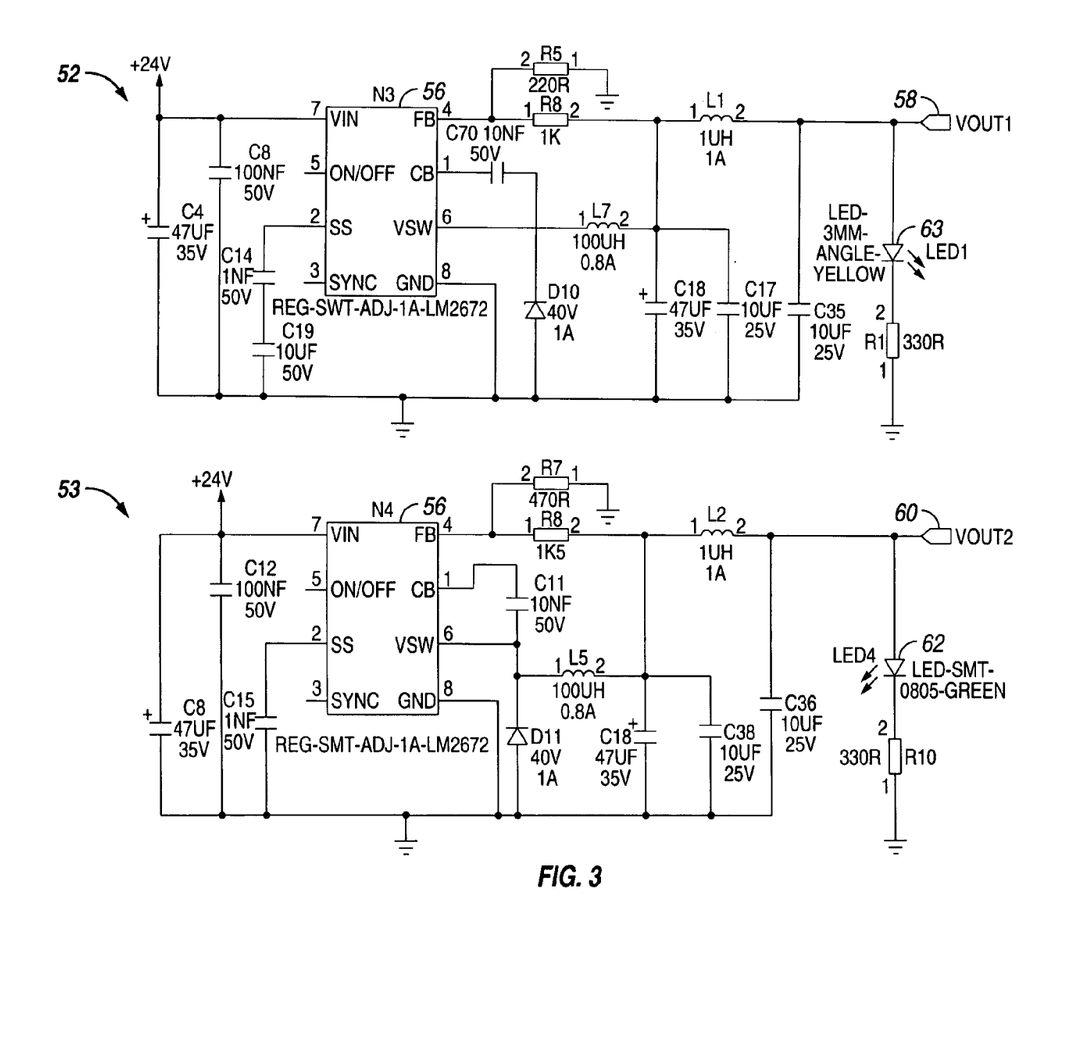

FIG. 3 is a schematic diagram of a preferred embodiment of a low DC voltage power supply circuit (power_supply) 50 practiced in the present HV switching power supply 10. The power supply circuit 50 provides low DC voltages for operating external devices, like the detector unit(s), connected to the power supply 10. In the exemplified preferred embodiment, the power supply circuit 50 comprised two switching regulator circuits 52 & 53 to provide +6.7V and +5V respectively to operate detector elements. National LM2672s regulators 56 were used in the switching regulator circuits 52 & 53 to respectively provide a +6.7 v output (Vout1) 58 and a +5V output (Vout2) 60. The LM2672s regulators 56 of both switching regulator circuits 52 & 53 were disposed in buck configuration. In this preferred embodiment, the +5V switching regulator circuit 53 had a green SMD LED 62 and the +6.7V switching regulator circuit 52 had a yellow angled LED 63 to differentiate and indicate the low voltage power supply 50 was turned on.

Figure 4:
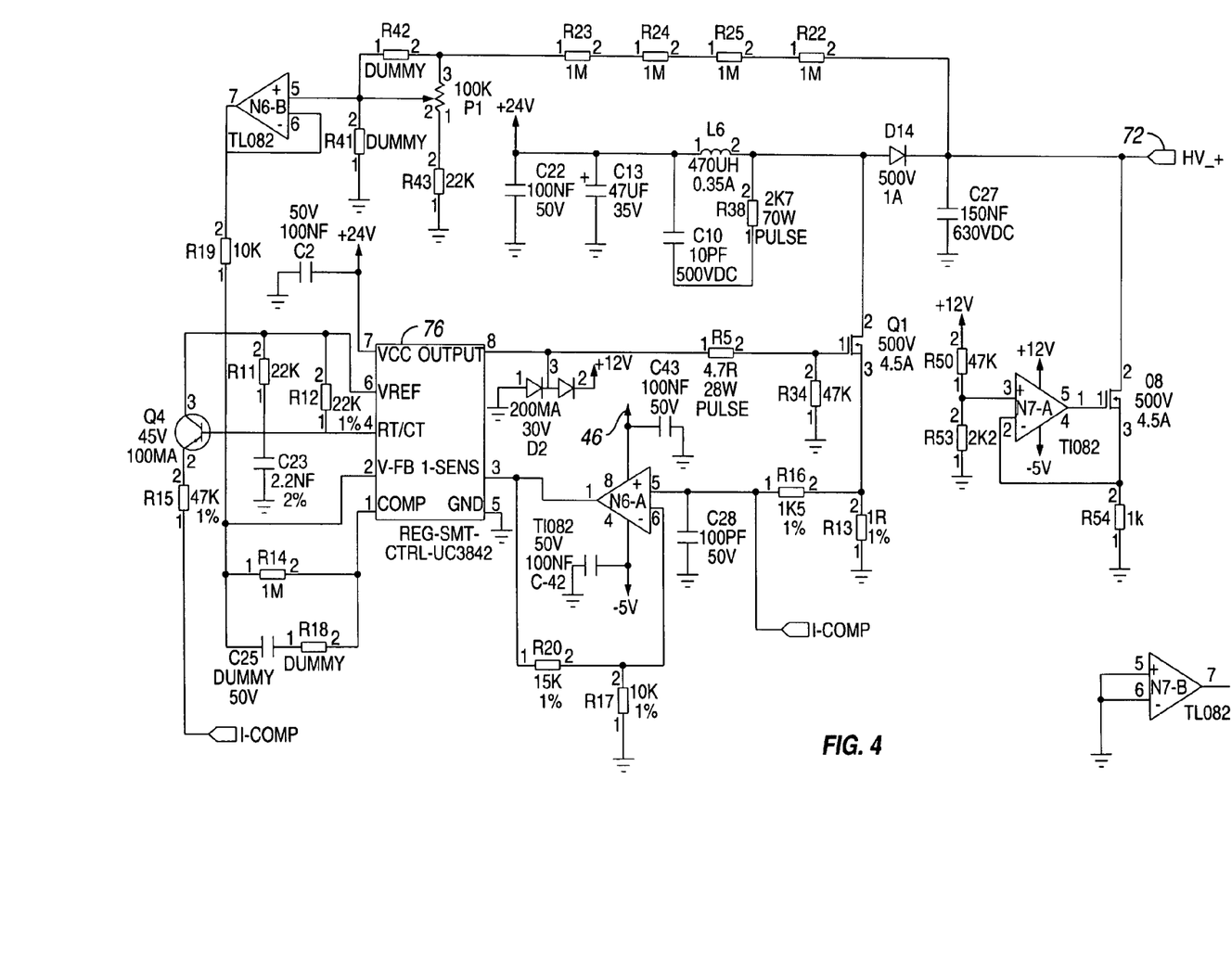

FIG. 4 is a schematic diagram of a preferred embodiment of a high voltage, switching power supply circuit (HV_supply) 70 of the present depolarizing/switching power supply 10. The HV power supply circuit 70 provides a high voltage bias output 72 to the high voltage switch circuit 90 (see FIG. 5). In the preferred embodiment shown, the HV switching power supply circuit 70 used a standard UC3842 current-mode PWM controller 76 operating in a boost configuration at about 75 kHz. A voltage feedback loop was used to adjust the voltage at high voltage bias output 72 to the desired level (about +350V in the present embodiment). The current feedback protected the switching power supply circuit 70 from short circuits and provided good transient response, improving HV bias rise time.

The voltage division utilized in the voltage feedback loop of the HV power supply circuit 70 was heavy and yielded a ripple voltage of 1–2 Vpp without compensation. A compensation circuit synchronized to the UC3842's oscillator circuit added an artificial ramp onto each current pulse. The compensation ensures the power supply did not skip pulses, and limited the voltage ripple to about 200 mVpp. A constant current load was used to provide about a 1.0 mA current drain for the power supply independent of the output voltage.

Figure 5:
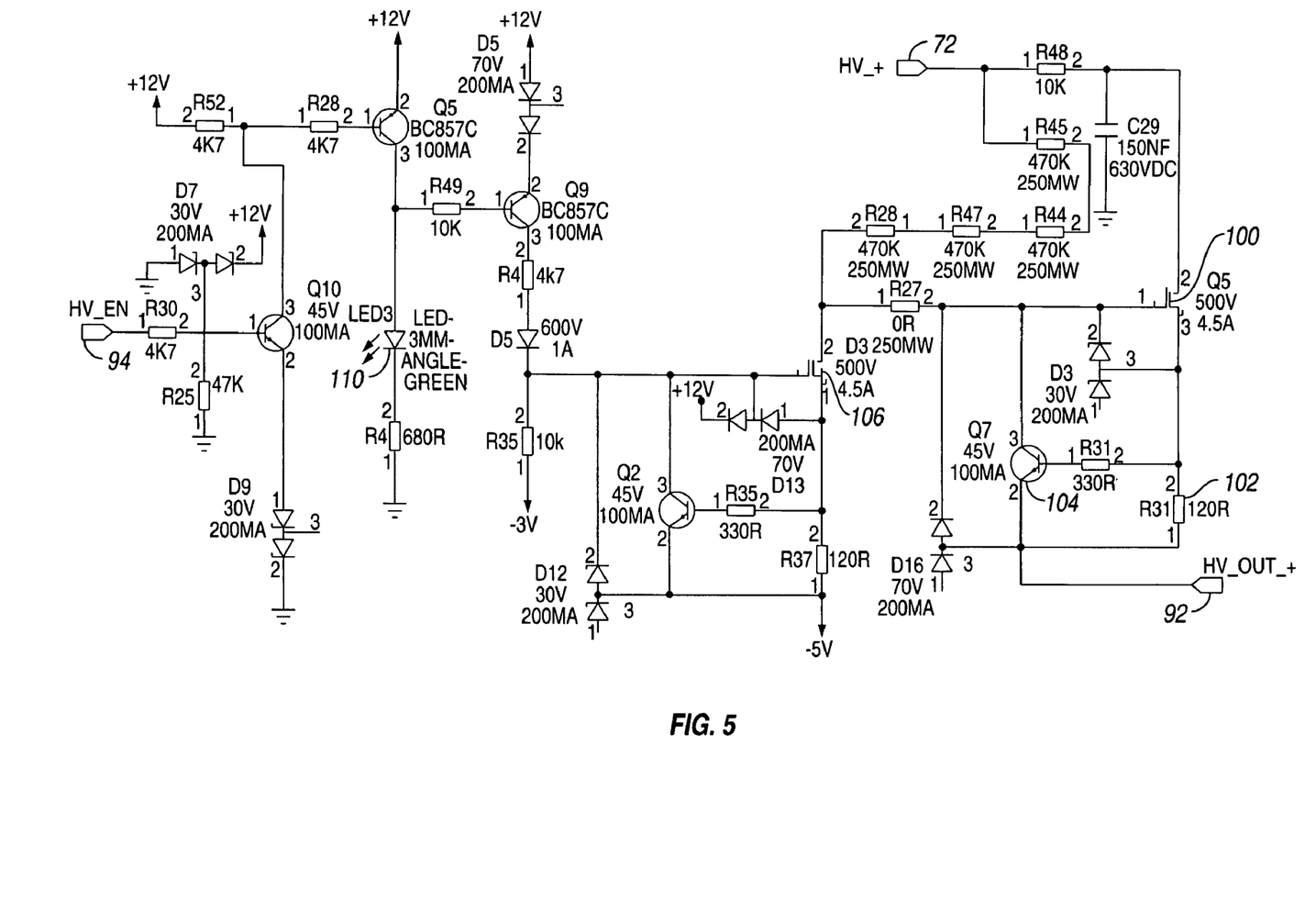

FIG. 5 is a schematic diagram of a preferred embodiment of a high voltage switching circuit (HV_switch) 90 practicable in the present HV depolarizing power supply 10. As shown in FIG. 5, the HV switching circuit 90 provides a high bias voltage at its HV voltage output 92 in response to the presence of an active high voltage enable signal at its signal input (HV-EN) 94.

However, when the high voltage enable signal at the signal input 94 is inactive or disabled, the HV switching circuit 90 provides a −5V DC bias at its voltage output 92. Additionally, when the high voltage enable signal at the signal input 94 goes inactive or is disabled, an FET sub-circuit in the H_switch 90 is cuts off the high voltage bias voltage. When the high voltage bias voltage is cutoff, the bias voltage at the HV voltage output 92 is pulled down to −5V, causing a reversal of the biasing current in the Cadmium-Telluride photo-conductor material. Reversing the biasing current in the photo-conductor material bleeds off the trapped electrical charge and de-polarizes the detector unit.

The Q5 FET 100 is connected in series with the HV bias. It has a pull-up to the HV bias, resulting in an output of HV-Vgs in the steady-state. During the ramp-up, current flowing through resistor 102 causes a voltage differential. The Q7 transistor 104 pulls the FET gate 100 closed when the set current limit is exceeded. This results in a triangular waveform for the HV bias voltage.

The Q3 FET 106 pulls the Q5 FET gate 100 down to −5V when open. This closes Q5 FET 100 and reverses the bias voltage. Q3 FET 106 has a similar current-limiter circuit as Q5 FET 100, resulting in a linear down slope. Opening and closing Q3 FET 106 enables controlling the bias voltage. The voltage of the Q3 FET gate 106 is controlled by the high voltage enable signal at the signal input 94. When the high voltage enable signal at the signal input 94 is active (enabled or "pulled high"), an indicator LED 110 was lit.

The high voltage switching circuit 90 can be operated at a much higher switching frequency than in the illustrated embodiment. There is about a 50 μsec initial delay between low-to-high bias voltage transition and the beginning of the HV bias voltage ramp. The delay is likely caused by the large resistors used in pull-up circuit and the FET gate capacitance. Modification of the characteristics of these components could lessen the delay. It was intended in the present embodiment that the imaging system operate at about 50 frames per second, thus enabling dynamic imaging, the X-raying of moving objects.

HV bias voltage rise and fall time are determined by the bias voltage current limiter (see FIG. 5) and the capacitance of the DIC detector unit. Approximate state change time (t) is given by:

$$t=(350V*C)/5\ mA$$

Figure 6:
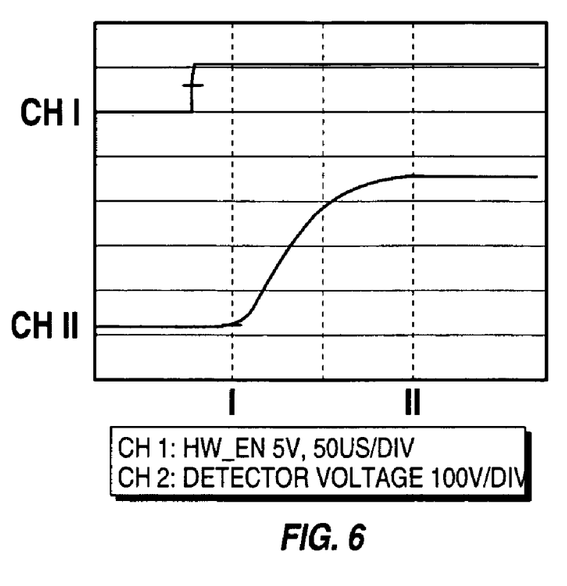
FIG. 6 (rising slope) displays the ramp-up and ramp-down waveforms of an actual Cd—Te semiconductor detector substrate where condition of the present HV power supply were: Ch1: HV_EN=5V, 50 μsec/div.; Ch2: Detector Voltage, 100 v/div.
Figure 7:
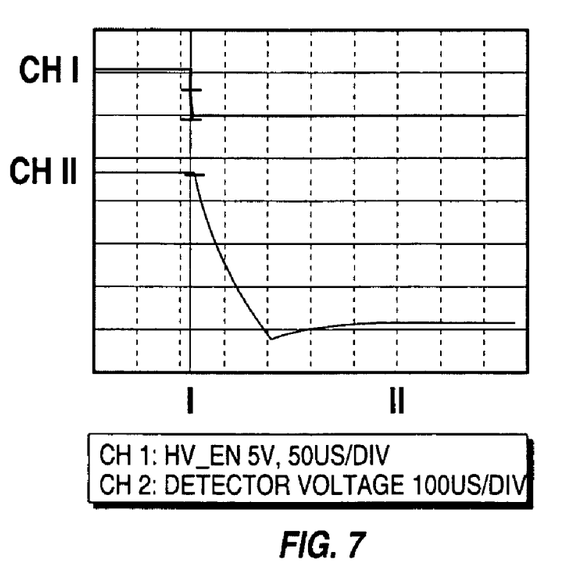
FIG. 7 (falling slope) displays the ramp-up and ramp-down waveforms of an actual Cd—Te semiconductor detector substrate where condition of the present HV power supply were: Ch1: HV_EN=5V, 50 μsec/div.; Ch2: Detector Voltage, 100 v/div.
Figure 8:
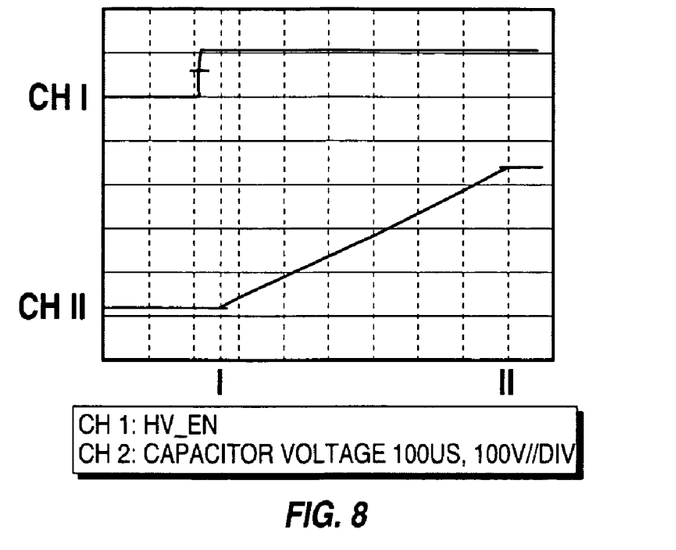
FIG. 8 (rising slope) demonstrates the flat slope produced by a pure capacitive load and the power supply current limiter, where: Ch1=HV_EN, and Ch2=Capacitor Voltage, 100 μsec, 100 v/Div.
Figure 9:
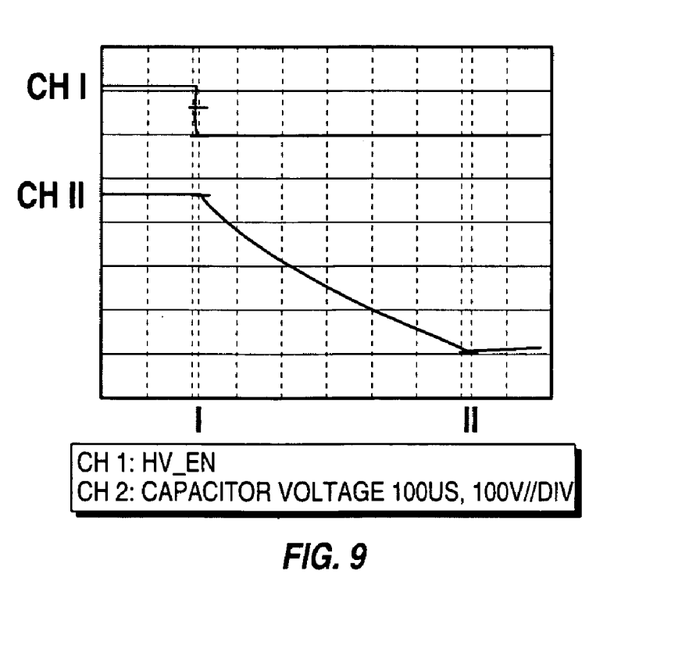
FIG. 9 (falling slope) demonstrates the flat slope produced by a pure capacitive load and the power supply current limiter, where: Ch1=HV_EN, and Ch2=Capacitor Voltage, 100 μsec, 100 v/Div.

About 6–7% of the decay/growth time (t) is not current limited. Load resistance seen by the detector capacitance (C) was not known. An accurate result could be measured separately for each detector and power supply 10 combination. An approximated result has to be multiplied to estimate when the HV bias voltage has settled within 1% of steady state. See FIG. 6.

FIGS. 6–9 display the ramp-up and ramp-down waveforms of an actual Cd—Te semiconductor detector unit. The unit under testing had four 1 cm². A DIC 100 has a 25 cm² area. The falling slope exhibits undershoot, which appears to originate from the Cd—Te detector unit. The undershoot amplitude is limited by the power supply 10 current limiter of the HV switch 90. The illustrated signal is almost a perfect 5 mA current-limited slope until the undershoot peaks.

Rise time is about 200 μsec, fall time is about 250 μsec. However, the detector takes several milliseconds to stabilize after the state change. Therefore, the ability of the power supply to ramp the high voltage is not the limiting factor in the depolarization process. The figures demonstrate the flat slope produced by a pure capacitive load and the power supply current limiter. The undershoot exhibited by the falling slope of the Cd—Te detector unit is not present with a capacitive load.

While the above description contains many specifics, these should not be construed as limitations on the scope of the invention, but rather as exemplifications of one or another preferred embodiment thereof. Many other variations are possible, which would be obvious to one skilled in the art. Accordingly, the scope of the invention should be determined by the scope of the appended claims and their equivalents, and not just by the embodiments.

What is claimed is:

1. A high energy X-ray imaging system comprising:
   a Cadmium-Telluride based radiation detector unit in a high energy imaging camera; and
   a depolarizing, switching high voltage power supply 10 with electric charge bleeding means, the power supply 10 in electrical communication with the radiation detector unit.

2. The high energy imaging system of claim 1, wherein the depolarizing power supply 10 comprises:
   an external power conditioning circuit 18 connected to an external power source 20 and providing a main operating voltage power connection 22 for communicating conditioned electrical power to other circuits of the power supply 10;
   an internal power supply 30, in electrical communication with the operating power connection 22, providing low positive and negative voltage power as required for the other circuits of the switching power supply 10;
   a low voltage power supply circuit 50, in electrical communication with the operating power connection 22, generates and provides low DC voltages for operating the detector unit;
   a high voltage power supply 70, in electrical communication with the operating power connection 22, generating and providing a high bias voltage at a high voltage bias output 72 for communication to the high voltage switch circuit 90; and
   a high voltage switch 90, in electrical communication with the operating power connection 22, the high voltage switch 90 being a fast-on/fast-off switch, and alternately providing a high DC voltage bias and low opposite polarity DC bleed voltage at a HV switch output 92 in response to the presence of an appropriate signal at a signal input 94, wherein the low opposite polarity DC bleed voltage at the HV switch output 92 comprises the bleed means for depolarizing the detector unit.

3. The high energy imaging system of claim 2, wherein the high voltage switch 90 alternately provides a high positive DC voltage bias and low negative DC bleed voltage at the HV switch output 92 in response to the presence of a signal at the signal input 94.

* * * * *

UNITED STATES PATENT AND TRADEMARK OFFICE
CERTIFICATE OF CORRECTION

| | | |
|---|---|---|
| PATENT NO. | : 7,154,100 B2 | Page 1 of 1 |
| APPLICATION NO. | : 10/537531 | |
| DATED | : December 26, 2006 | |
| INVENTOR(S) | : Konstantinos Spartiotis and Olli Mannisto | |

It is certified that error appears in the above-identified patent and that said Letters Patent is hereby corrected as shown below:

In Col. 5. line 6, replace the phrase "the H_switch 90 is cuts off" with --the HV_switch 90 cuts off--.

Signed and Sealed this

Tenth Day of April, 2007

JON W. DUDAS
*Director of the United States Patent and Trademark Office*